United States Patent
Hurwitz et al.

(10) Patent No.: US 11,711,689 B2
(45) Date of Patent: Jul. 25, 2023

(54) SECURE LOCALIZED CONNECTIONLESS HANDOFFS OF DATA

(71) Applicant: Google LLC, Mountain View, CA (US)

(72) Inventors: Jonathan D. Hurwitz, San Jose, CA (US); Diane Wang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/331,185

(22) Filed: May 26, 2021

(65) Prior Publication Data

US 2022/0386112 A1 Dec. 1, 2022

(51) Int. Cl.
*H04L 29/06* (2006.01)
*H04W 12/033* (2021.01)
*H04L 9/14* (2006.01)
*H04L 9/08* (2006.01)
*H04W 12/63* (2021.01)
*H04L 9/32* (2006.01)

(52) U.S. Cl.
CPC ......... *H04W 12/033* (2021.01); *H04L 9/0819* (2013.01); *H04L 9/14* (2013.01); *H04L 9/3242* (2013.01); *H04W 12/63* (2021.01)

(58) Field of Classification Search
None
See application file for complete search history.

(56) References Cited

U.S. PATENT DOCUMENTS

| | | | |
|---|---|---|---|
| 2008/0109302 A1* | 5/2008 | Salokannel | H04W 4/80 705/14.1 |
| 2013/0185559 A1 | 7/2013 | Morel et al. | |
| 2014/0357192 A1 | 12/2014 | Azogui et al. | |
| 2015/0271629 A1 | 9/2015 | Knaappila et al. | |
| 2016/0219024 A1* | 7/2016 | Verzun | H04L 63/102 |
| 2018/0241561 A1 | 8/2018 | Albertson et al. | |
| 2020/0118109 A1* | 4/2020 | Hubert | G06Q 20/3674 |
| 2020/0274701 A1 | 8/2020 | Yuan et al. | |

FOREIGN PATENT DOCUMENTS

| | | |
|---|---|---|
| WO | 2009154947 A2 | 12/2009 |
| WO | 2015171939 A1 | 11/2015 |
| WO | 2016/168409 A1 | 10/2016 |

OTHER PUBLICATIONS

Martin et al., "Handoff All Your Privacy—A Review of Apple's Bluetooth Low Energy Continuity Protocol," Proceedings on Privacy Enhancing Technologies, Jun. 15, 2019. Retrieved from the internet <https://arxiv.org/pdf/1904.10600.pdf>, 20 pages.

(Continued)

*Primary Examiner* — Andrew J Steinle
(74) *Attorney, Agent, or Firm* — Lerner David LLP

(57) ABSTRACT

A connectionless system for handing off data, content or information includes a proximity detection component that allows devices to detect other local devices within range. Devices within range may use advertisement and scanning to exchange communications so that one device can handoff data, content, or information to another device without having to connect, e.g., pair, with the other device(s).

22 Claims, 6 Drawing Sheets

500

(56) References Cited

OTHER PUBLICATIONS

Baert et al., "A BLE-based multi-gateway network infrastructure with handover support for mobile BLE peripherals," 2019 IEEE 16th International Conference on Mobile Ad Hoc and Sensor Systems (MASS), 2019, pp. 91-99, doi: 10.1109/MASS.2019.00020. 9 pages.

International Search Report and Written Opinion for International Application No. PCT/US2022/030888 dated Oct. 5, 2022. 17 pages.

Invitation to Pay Additional Fees for International Application No. PCT/US2022/030888 dated Jul. 26, 2022. 2 pages.

"How Chromecast Works" [online]. Originally Published: Jan. 29, 2014; Updated: Jul. 28, 2021. [Retrieved Feb. 24, 2023] Retrieved from the internet: <https://electronics.howstuffworks.com/chromecast.htm>, 11 pages.

"Cast Connect' makes Casting on Android TV more native with remote control support" [online]. Aug. 5, 2020. [Retrieved Feb. 24, 2023], Retrieved from the internet: <https://9to5google.com/2020/08/05/android-tv-cast-connect/>, 7 pages.

"Apple Platform Security: Handoff security" [online]. Feb. 18, 2021. [Retrieved Feb. 22, 2023], Retrieved from the Internet: <https://support.apple.com/guide/security/handoff-security-secf78dbe639/web>, 2 pages.

\* cited by examiner

200

300

400

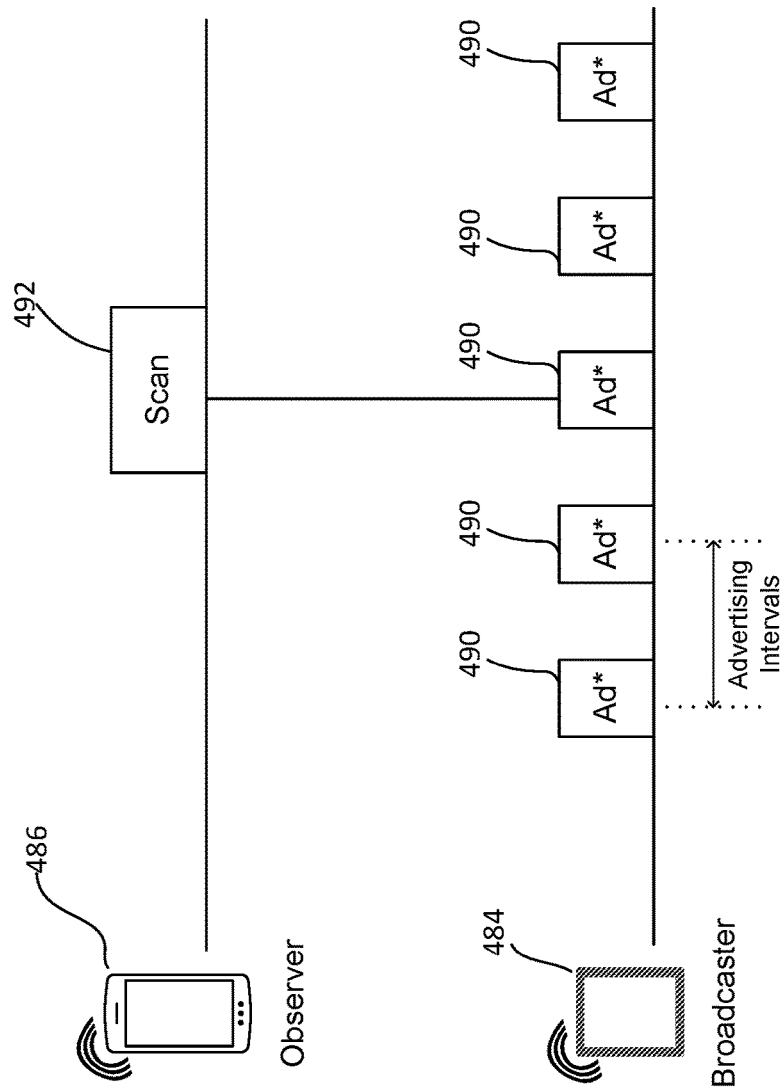

SECURE LOCALIZED CONNECTIONLESS HANDOFFS OF DATA

BACKGROUND

It is not uncommon for a modern home to have multiple computing devices that can communicate with other computing devices, e.g., servers, via the Internet. For example, such a home may have a smart television, a laptop, desktop, exercise equipment, appliances, and a smartphone. These devices may also communicate with each other via a local area network (LAN) within the home. Each of these devices may also independently communicate over a wired (e.g., Ethernet) or wireless (e.g., WiFi) network to a computing system accessible via a wide area network, e.g., internet. The computing system may support applications, e.g., banking applications, exercise and/or health applications, that can be run on more than one of the devices. In some instances, it may be convenient for data or an application being processed on one device to be handed off to another device. For instance, a user may run an exercise application that requires a user to change locations. For example, the exercise routine may include an outdoor component, e.g., a run, and an indoor component, e.g., mat exercises. As the user changes locations, the user may desire that the application or data be securely handed off from her smart phone to her smart television.

SUMMARY

Aspects of the disclosed technology may comprise systems, apparatuses, or methods.

In one aspect, the disclosed technology may comprise a method for connectionless data handoff. The method may comprise sending, by a first device, a locally generated first key to a computing device; receiving, by the first device, from the computing device a locally generated second key of a second device; scanning, by the first device, for encrypted data transmitted by the second device; and decoding, by the first device, using the second key encrypted data transmitted by the second device to produce decrypted data. The method may also comprise processing, by the first device, the decrypted data for display on the first device.

In accordance with this aspect of the technology, the first device may comprise a device with a larger screen than the second device.

In accordance with this aspect of the technology, the first device may store the second key as part of a tuple that further comprises user account information, a device ID associated with the second device, an old encryption key associated with the second device, a TTL (time to live) of the old encryption key.

In accordance with this aspect of the technology, the method may comprise associating, by the computing device, the first key and second key with a user account.

In accordance with this aspect of the technology, the method may comprise generating, by the first device, the first key using a hash function or randomly generated string generated by the first device.

In accordance with this aspect of the technology, the method may comprise sensing, by the first device, the presence of the second device. In addition, sensing comprises determining a distance between the first device and the second device using round trip delay. Further, determining may comprise using wireless technology to detect the distance.

In accordance with this aspect of the technology, the decrypted data may comprise one or more of video content or health statistics.

In accordance with this aspect of the technology, the computing device comprises a server coupled to the first device and second device over a first network. In addition, scanning may be performed by the first device over a second network different than the first network.

Another aspect of the disclosed technology may comprise a method for connectionless handoff of data. The method may comprise sending, by a first device, a locally generated first key to a computing device; receiving, by the first device, a second key generated by a second device; sensing, by the first device, a location of a second device within a predetermined distance of the first device; and periodically broadcasting, by the first device, content encrypted using the first key to the second device.

In accordance with this aspect of the disclosed technology, the first device comprises a device with a smaller screen than the second device.

In accordance with this aspect of the disclosed technology, the first device may store the second key as part of a tuple that further comprises user account information, a device ID associated with the second device, an old encryption key associated with the second device, a TTL (time to live) of the old encryption key.

In addition, the method may comprise associating, by the computing device, the first key and second key with a user account. The method may also comprise generating, by the first device, the first key using a hash function or randomly generated string generated by the first device.

In accordance with this aspect of the disclosed technology, sensing may comprise determining a distance between the first device and the second device using round trip delay.

In accordance with this aspect of the disclosed technology, determining comprises using one of ultrawideband signals, Bluetooth low energy signals, or Bluetooth RSSI signals to detect the distance. In addition, the encrypted content comprises one or more of video content or health statistics. Further, the computing device may comprise a server coupled to the first device and second device over a first network.

In accordance with this aspect of the disclosed technology, scanning may be performed by the first device over a second network different than the first network. Further, the method may comprise periodically broadcasting the content encrypted using the first key over the second network.

BRIEF DESCRIPTION OF DRAWINGS

FIG. 4B illustrates an example system in accordance with an aspect of the disclosed technology.

DETAILED DESCRIPTION

Overview

Figure 1:
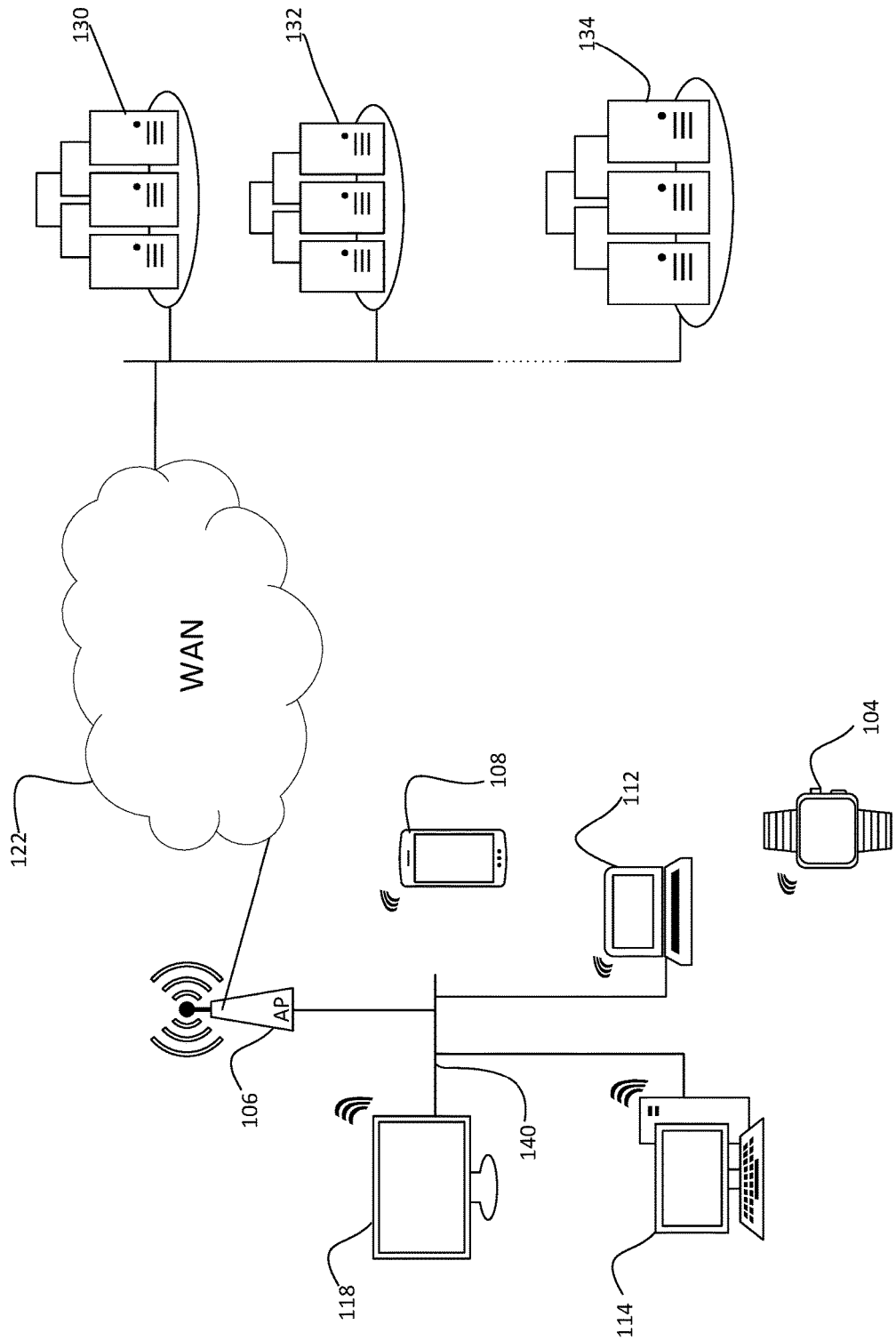
FIG. 1 illustrates an example system in accordance with an aspect of the disclosed technology.

This technology relates to techniques for securely handing off an active application running or, alternatively data, on a first device to a second device, without requiring "pairing" of the devices or that the devices reside on a common network prior to initiation of the handoff. As an example, an application on a first device may run a workout routine that includes an outdoor component (e.g., a 5 k run) to be followed by an indoor component (e.g., yoga). The first device in this instance may comprise a mobile phone, smart watch, or other portable device that a user may wear or carry on their person while performing the outdoor component. As the outdoor component comes to an end, the user may then enter their home to perform the indoor component. As the user comes indoors and within proximity of other devices within their home that may also run the application, the application running on the first device may be handed off to a second device among the other devices for display of information relating to the active application. The second device may comprise a television receiver, computer, tablet, or any other device capable of running the application. Once the handoff takes place, the user may continue with the indoor component of the workout routine by viewing the second device.

In the foregoing example, the technology is described in the context of a workout routine having an indoor component and outdoor component. The technology is not limited to that example. For instance, the technology may involve an application that begins indoors on a first device and gets handed off to a second indoor device. For example, the application may involve a workout routine in which a user may desire to move from one location within a home to a second location. In such an example, the application may initially run on a first device such as a mobile phone, laptop, or other portable device. The user may then desire to have the already active application handed off to another device with a larger screen, e.g., a television receiver. In this example, the active application may comprise a workout application, as well other applications such as an application that streams a movie or other entertainment content (e.g., YOUTUBE), a banking application, a text editor, or any other application that a user may find useful.

An aspect of the disclosed technology is secure key generation and sharing device keys among handoff device candidates associated with a user account. For instance, a technique for implementing this aspect of the technology may comprise, prior to occurrence of a handoff, sharing of one or more decryption keys among handoff device candidates intended to pick up or acquire broadcasted encrypted data. Each handoff device may comprise a device signed into a user account. The user account may be an online email account such as for example, a Google or Gmail account. The account may comprise any account that allows for registration of user devices and key sharing among registered devices. A unique key stored in association with the account may be used to decrypt data sent by a device signed into the account to another device signed into the account. For devices not yet signed into the account, upon being signed into the account, such devices would then become candidate handoff devices.

A unique key is generated locally on a device and may comprise a randomly generated string or a string generated by a hash. Once a key is generated, it is stored in a tuple (e.g., a sequence of n elements or an ordered list) on a server and linked to a user's account. As such, each device associated with a user account will generate and have stored on the server a unique key. In addition, each device associated with an account may store unique keys for other devices associated with a user account. As part of the process of effecting application handoff from a first device to a second device, the second device uses the unique key of the first device to decrypt encrypted data broadcasted by the first device. That is, the first device uses its unique key to encrypt and securely transmit application content or data to the second device. The second device then uses that unique key to decrypt the application content or data it receives and present the data or content to the user.

Where keys are stored on a remote server over the Internet, devices may need to connect to the server to provide and have access to keys of devices associated with a given user account. In general, the devices will need to be capable of connecting to the server over one or more networks. For instance, the devices may need the capability to connect to the Internet directly (e.g., via a WiFi, LAN, cellular) or indirectly (e.g., via Bluetooth (e.g., a BT-tethered watch) and another device (e.g., a smartphone with Internet access) that has an Internet connection) in order to connect to or link up with the server. In another instance, the functionality of maintaining and providing device keys may be performed by, for example, a local computer that provides equivalent functionality to that provided by a server accessible via the Internet. As a further example, instead of needing to connect to the internet, a Google home speaker could be the mediator and key store/share device (instead of requiring, for example, a Google server). In these latter instances, the system may be considered localized with respect to a building or other location in which user devices linked to the user account are available for content or data handoff as a WAN or Internet connection is not necessary.

The tuple associated with a device may be, for example, of the form: (User_acct., device ID, new_encryption_key, old_encryption_key, new_TTL (time to live), old_TTL). The new_encryption_key and old_encryption_key may be stored in case, for example, a WiFi or network connection fails and keys are not updated locally on other devices. Nearby or candidate devices may then use either the old or new key in an attempt to decrypt received content or data. "old_TTL" refers to the expiration date of the old key, at which point it becomes invalid and its associated field in the tuple zeros out or is set to zero. When a new key or hash is created, all devices associated with an account may update their local storage with this new information.

Another aspect of this technology is proximity detection between nearby devices or devices located within listening range of each other. In an example, proximity detection may be based on techniques that use round-trip time of one or more transmitted signals and/or reflected signals to estimate a distance between two devices. In another example, ultra-wideband (UWB) technology may be used for this functionality. In another example, Bluetooth low energy (BLE) or Bluetooth received signal strength indicator (RSSI) may be used to estimate the distance. Since there is variance, which can at times be significant, in received signal strength based on antenna design, signal losses (e.g., chassis of a device), and more, using RSSI trending to determine a changing distance between points versus using the absolute value of RSSI might be preferred in some instances. Where multiple devices are present, trilateration can be used to estimate the distance between multiple devices. As an example of proximity detection, if a user is engaging in a workout on their watch and moves close to their television (e.g., Google TV), RSSI can be used to determine closeness between the watch and television and suggest an action chip to move to a guided workout on the TV. For example, if the watch and TV are within a certain distance or detected power level that falls below a threshold value, the user may be alerted via the watch or TV that the TV is available for viewing or interacting with content or data (e.g., a streaming workout) presented on the watch.

An aspect of the disclosed technology is that it employs a connectionless scheme. A connectionless connection allows a device to get real time information (e.g., health statistics) on another device without an explicit connection. In particular, devices may communicate with each other without connection via, for example, advertisement and scanning. Advertisement is a form of broadcasting in which all nearby devices can listen. As such, this aspect of the disclosed technology is not limited to a unicast or point-to-point connection scheme. Instead, a device may "broadcast" or "speak" with multiple endpoints or other devices concurrently. BLE scanning and advertising may be employed in accordance with this aspect of the disclosed technology. Further in accordance with this aspect of the disclosed technology, an advertisement may vary between 6 and 37 bytes. This may typically be large enough to allow for communication of encrypted information between devices. Encrypted information may comprise information in an advertisement packet for example which may or may not be sensitive, such as name, health, photo, etc. The payload may contain a custom preamble (within the data part of the payload) that is unencrypted and corresponds to the device's unique ID. This ID is the same one present in the tuple discussed above. Listeners (devices scanning) will unpack the payload, read the device ID, and use that value as a hash in order to do a hash table lookup, thereby obtaining the tuple that corresponds to this device. As mentioned above, the tuple stores the old and new encryption keys, which can be used to decrypt the rest of the payload. After this, raw data can be processed.

As the disclosed technology does not employ a point-to-point connection, the advertisement and scanning scheme employed is essentially unidirectional. However, bi-directional communication may be obtained by emulating features of a point-to-point connection using sequence numbers in the advertisement field's payload. To ensure that listeners pick up on the packets that advertisers are sending, packets may be retransmitted a certain number of times. A sequence number or identifier may be attached to the advertisement packet if the data is related to some time series, such as real-time heart rate data.

An example in accordance with the above aspects of the disclosed technology may comprise a user undertaking an exercise routine that involves using a watch to track, process and accumulate statistics associated with one or more detected health related parameters. The watch may register with a user account, such as a Google Gmail account. In addition, a TV associated with the user may also be registered with the user account. The watch and TV may each generate local unique keys. Each key is shared with a server and associated with the user's Gmail account. In addition, each device associated with the account, e.g., the watch and TV, may acquire keys of all the other devices associated with the account. When the watch is located within a certain distance of the TV, the TV may alert the user that it is available for displaying data associated with the exercise routine running on the watch. If the user desires the data to be displayed on the TV, the watch may then advertise the data it collects using its unique key and the TV may scan for such advertisements and decrypt them using the watch's key to obtain the collected data and display it on the TV. Alternatively, the user may not need to be alerted and the data may be sent to the TV automatically by, for example, having a user indicate preferences for automatically switching display from the watch to the TV whenever the two devices are proximate to each other. In other examples, a user may be allowed to set the distance at which automatic handover may occur.

Data may be exchanged by the watch and TV by concatenating strings into the advertisement packet payload field. To enable real-time health stats on the TV, the watch may add in an identifying header that signifies the type of data being sent, and the TV will need to use this identifier to determine the offset between the values in the payload field. The scope of data may comprise a vector that includes, but is not limited to, one or more the following data: heart rate, heart rate variability, respiration rate, calories burned, movement data (e.g., steps, distance, altitude, speed). The watch broadcasts advertisements with the data at some periodic interval (e.g., every 2 seconds) and listeners such as the TV scans for the advertisements, use the decryption key to decode the data, and display it in real time.

In one aspect, the disclosed technology may be used in connection with applications that are whitelisted by a user. For example, the user may select certain applications residing on a smartphone for use with the disclosed system and technique. For example, the user may select fitness applications (e.g., a Fitbit application), content streaming applications (e.g., YOUTUBE) or other applications that are whitelisted such that when those applications are active, they may be handed off to different devices associated with a user account.

The technology may be implemented in a communications platform, such as BlueTooth or WiFi, and avoid pairing by using advertising and scanning and sharing a key in the background over the BlueTooth or WiFi connection. This avoids pairing to do a key exchange between devices. In this regard, pairing usually requires a user to perform an action (e.g., enter a code appearing on to be paired device). In accordance with one or more aspects of the disclosed technology, user action required to establish a connection may advantageously be avoided.

The foregoing aspects of the disclosed technology provides as one advantage avoiding having to explicitly pair or connect devices involved in the data handoff, such would be required for example in a Bluetooth connection. In addition, communication between devices occurs in a secure manner using locally generated keys. Another advantage of the disclosed system and technique is that devices may share data even where a LAN or other network may be unavailable. Further, the communication link between devices is not available for use by unregistered devices running locally on other networks. In addition, because there is no need to explicitly pair and connect devices to one another, the entire user experience is more seamless. In addition, the technology mitigates latency since keys associated with a user account can be stored on each device associated with the user account. As such, delay associated with obtaining keys as part of private/public key schemas or delay associated with pairing is mitigated or avoided.

Example Systems and/or Apparatus

FIG. 1 illustrates an example system 100 in accordance with an aspect of the disclosed technology. The system may include a plurality of computing devices capable of communicating through an access point with one or more servers. The computing devices may include for example watch 104, phone 108, laptop 112, desktop 114, and smart display or television 118. In some examples, computing devices watch 104, phone 108, laptop 112, desktop 114, smart display or television 118, and AP 106 may be considered as forming an on-premise or local area network (LAN) in that each of these computing devices may communicate with each other without involving WAN by using one or more of near field, Bluetooth, or WiFi technology.

Watch 104 may be a smartwatch with the capability to detect health related and other parameters associated with a wearer. In this regard, watch 104 may include one or more sensors configured to detect health related metrics of a wearer. For example, watch 104 may employ sensors and associated technology for performing photoplethysmography (PPG). More specifically, watch 104 may include a light source, such as an LED for example, and a photodetector, which together may form a sensor or sensing circuitry. Using the light source and photodetector, heart rate computations may be made based on PPG technology. Watch 104 may also include other technology, e.g., GPS, accelerometers, that allow tracking of the distance the wearer travels while wearing the watch, changes in elevation, the number of steps the wearer makes, and measure stress. Watch 104 may also detect and monitor sleep patterns associated with the wearer.

Watch 104 may also include technology that allows it to communicate with other computing devices. Such technology may include BlueTooth, WiFi, and cellular communications (e.g., 4G, New Radio ("NR") or 5G). WiFi communications may take place via access point (AP) 106. Cellular communications may take place via wireless towers, which are not shown for the sake of simplifying FIG. 1.

Watch 104 may communicate directly with another computing device such as phone 108 via BlueTooth. Phone 108 in some examples may comprise a smartphone, which may also communicate via AP 106 using WiFi technology or over a cellular network. Phone 106 may also include near field communication (NFC) capabilities. Phone 106 may run applications that allow it to receive and further process data received from watch 104 or other computing devices. Such data may include health related metrics or data or signals from which health related metrics may be derived. More generally, such data may comprise any data residing on phone 108, or the other computing devices. Phone 108 may also run various other software and/or applications that access data and other information via or on WAN 122. WAN 122 may be considered a network of communications equipment and computing devices that provide services to other computing devices. WAN 122 in some examples may be considered the Internet. WAN 122 may also provide access to computing devices 130, 132, and 134, which may be thought of as server farms, data centers or private networked computing devices. In this regard, computing devices 130, 132, and 134 may be considered as part of WAN 122 or the Internet in some examples.

As another example, a computing device may comprise a laptop 112 or desktop 114. Laptop 112 and desktop 114 comprise computing devices that include software and/or applications that may also access data on WAN 122 or residing on computing devices 130, 132, and/or 134. Laptop 112 and desktop 114 may access such data either wirelessly via AP 106 or via wired network 140. Wired network 140 may, for example, comprise an Ethernet. Laptop 112 and desktop 114 may also include BlueTooth and near field communication technology. Laptop 108 and desktop 114 may therefore communicate with each other directly or each communicate with phone 108 or watch 104.

As another example, a computing device may comprise smart display or television 118. Smart display/TV 118 may communicate with AP 106 to access WAN 122 or any of computing devices 130, 132, and 134. Smart display/TV 118 may thus employ WiFi technology. In addition, smart display/TV 118 may also employ BlueTooth and near field communication technology. Smart display/TV 118 may also be connected to AP 106 via Ethernet network 140. In some instances, AP 106 may comprise a cable modem through which smart TV/display 118 may also access data, such as video content, on WAN 122 or computing devices 130, 132, and/or 134.

Figure 2:
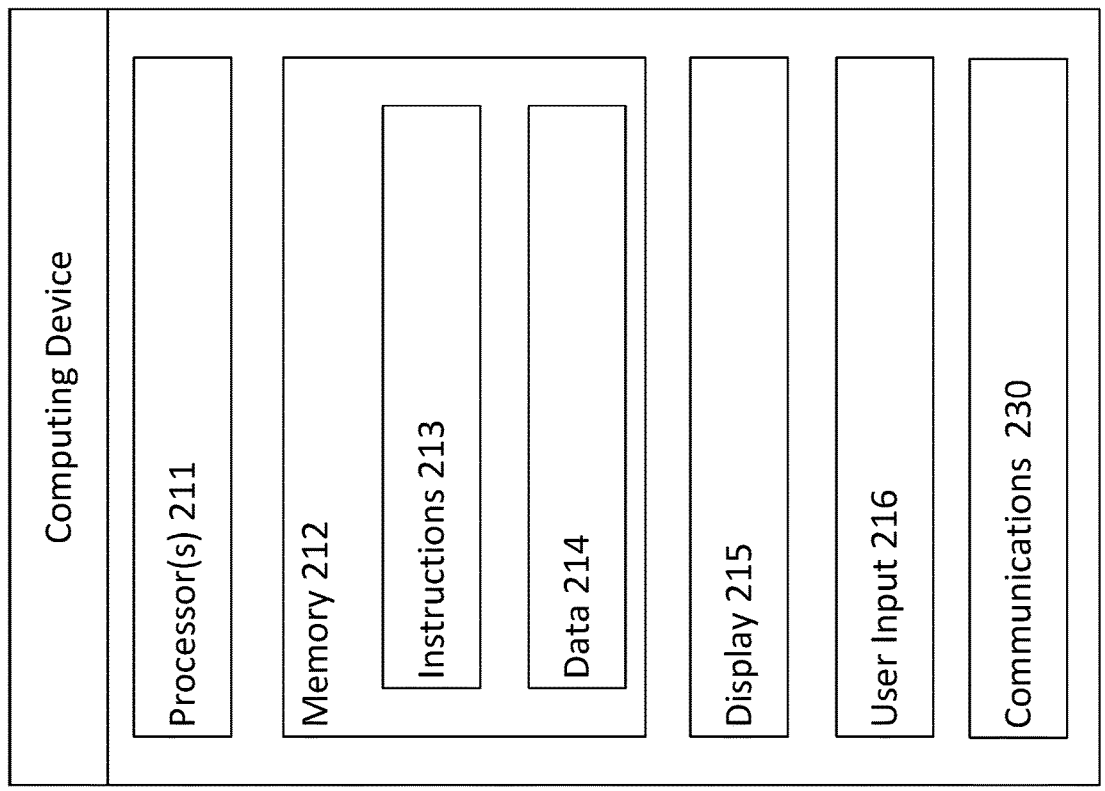
FIG. 2 illustrates an example computing device in accordance with an aspect of the disclosed technology.

FIG. 2 illustrates an example computing device 200 in accordance with an aspect of the disclosed technology. Computing device 200 may comprise anyone of computing devices: watch 104, phone 108, laptop 112, desktop 114, smart display or television 118, and computing devices 130, 132, and 134. Computing device 200 may include one or more processors 211, memory 212, instructions 213, and data 214. Computing device 200 may also include a display 215, user input 216, and communications 230.

The one or more processors 211 may include any conventional processors, such as a commercially available CPU or microprocessor. Alternatively, the processor can be a dedicated component such as an ASIC or other hardware-based processor. Although not necessary, computing device 200 may include specialized hardware components to perform specific computing functions faster or more efficiently.

Although FIG. 2 functionally illustrates the processor, memory, and other elements of computing devices 200 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the computing devices 200. Accordingly, references to a processor or computing device will be understood to include references to a collection of processors or computing devices or memories that may or may not operate in parallel.

Memory 212 of computing device 200 may store information that is accessible by one or more processors 211. That information may comprise instructions 213 and/or data 214. The instructions 213 and data 214 may be retrieved, manipulated, or stored by the processor(s) 211. Memory 212 may be of any non-transitory type capable of storing information accessible by the processor 211 including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories.

The instructions 213 can be any set of instructions to be executed directly, such as machine code, or indirectly, such as scripts, by the processor(s) 211. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods, and routines of the instructions are explained in more detail below.

Data 214 may be retrieved, stored, or modified by processors 111 in accordance with instructions 213. For instance, although the present disclosure is not limited by a particular data structure, the data 214 may be stored in computer registers, in a relational database as a table having a plurality of different fields and records, XML documents, or flat files. The data 214 may also be formatted in a computer-readable format such as, but not limited to, binary values, ASCII, or Unicode. By further way of example only, the data 214 may comprise information sufficient to identify the relevant information, such as numbers, descriptive text, proprietary codes, pointers, references to data stored in other memories (including other network locations), or information that is used by a function to calculate the relevant data.

Display 215 and other displays described herein may be any type of display, such as a monitor having a screen, a touch-screen, a projector, or a television. In this regard, in some examples display 215 may comprise an actual display that forms a part of the device. In other examples, display 215 may comprise a display external to the computing device such that the computing device need only provide a display port (e.g., HDMI port). The display 215 of the one or more computing devices 200 may electronically display information to a user via a graphical user interface ("GUI") or other types of user interfaces. For example, as will be discussed below, display 215 may electronically display a notification indicating that a first computing device associated with a user account is within range of a second computing device, and data or applications residing in or running on the first device may be shared with the second device.

The user inputs 216 may be a mouse, keyboard, touch-screen, microphone, or any other type of input. User input 216 may be included as part of computing device 200 or may be provided separate from the device 200.

Communications block 230 may comprise circuitry and associated instructions or methods that allow for communications using near field, Bluetooth, WiFi, cellular, Ethernet, or other communication technologies. For example, communications block 230 may comprise a wireless interface including circuitry that forms a wireless transmitter and receiver and software modules (e.g., instructions residing in memory 212 or on memory in communications block 230) that transmit and receives data to and from AP 106. Similarly, it may comprise the components within computing device 200 necessary to communicate using any of the foregoing communications technologies.

Computing device 200 may be equipped differently in terms of the number of processors, number and size of memories, whether it includes a display, the type of user input or communications block. For example, where computing device 200 is one of computing devices 130, 132, or 134, computing device 200 may comprise a server. In this instance, computing device may have multiple processors that run independently of each other, multiple memories, and multiple communications blocks. In this instance, computing device may only provide ports for connecting a display and a keyboard. In other examples, computing device 200 may be equipped as described above to form a smartphone, smart watch, laptop, or desktop as known in the art.

Figure 3:
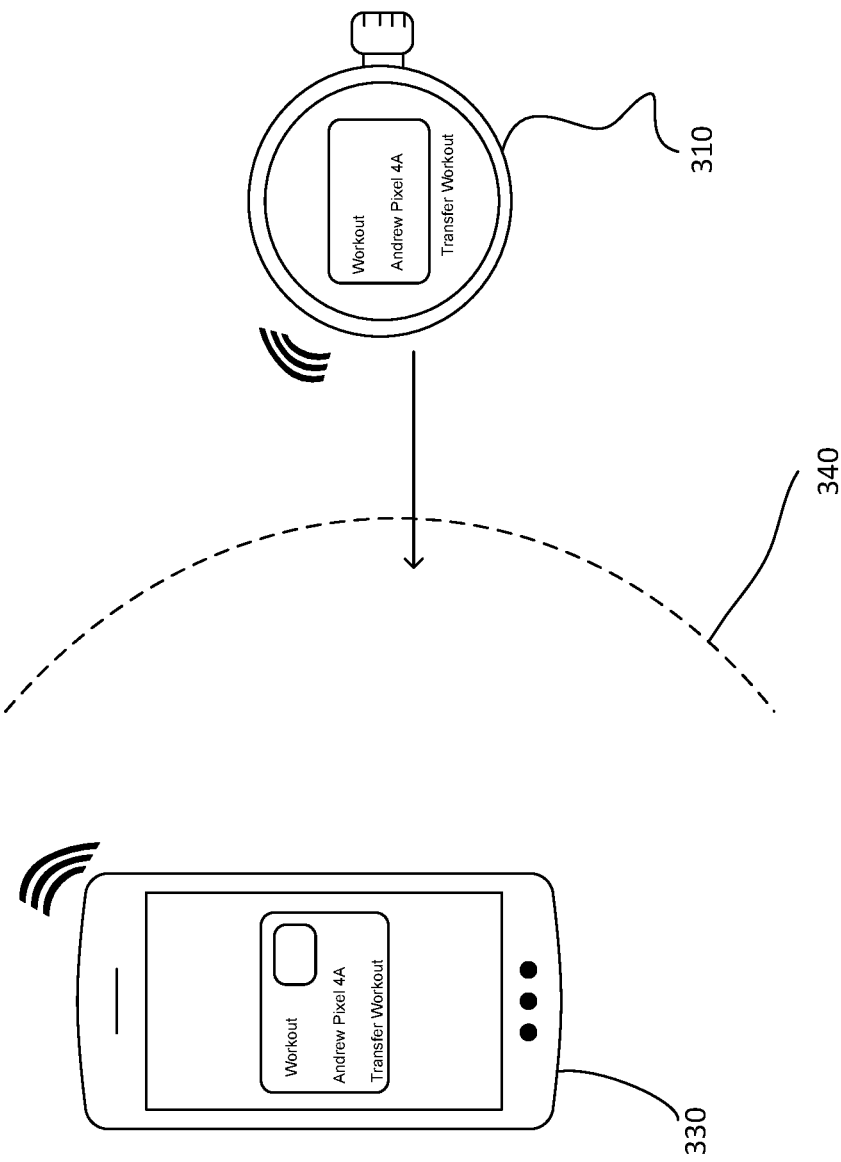
FIG. 3 illustrates an example system in accordance with an aspect of the disclosed technology.

FIG. 3 illustrates an example system 300 in accordance with an aspect of the disclosed technology. System 300 comprises a smart watch 310 and smartphone 330. Smartwatch 310 and smartphone 330, as is explained in further detail below, are associated with or registered with a given user account (e.g., Andrew Pixel Google account). In this instance, smartwatch 310 is being worn by the user or owner of the user account while the user is participating in a workout, which may include for example an outdoor component and an indoor component. As part of the workout, the user or wearer of smartwatch 310 may desire or need to change from a location to the right of detection threshold boundary 340 to a location to the left of the boundary 340. Detection threshold boundary 340 illustratively depicts a distance at or within which smartphone 330 or smartwatch 310 are able to sense or detect each other's presence. Detection threshold boundary 340 may, for example, comprise the outer walls defining a building such as a home or a room within a home. As the smartwatch 310 approaches the threshold boundary it senses or detects the presence of smartphone 330. When it senses smartphone 330, smartwatch 310 may display a prompt to the user indicating that the workout may be transferred or handed off to smartphone 330 (e.g., Andrew Pixel 4A). If the user selects or approves handoff of the workout to the smartphone 330, the smartwatch 310 may then securely transmit the data it collects from the user (e.g., health related metrics) to the smartphone 330 for display or further processing while the user continues the workout. For example, the smartphone 330 may display the heart rate detected by smartwatch 310. This allows the user to then more easily view the heart rate or other data collected by the smartwatch.

In other instances, selecting or approval of the handoff of the workout from the smartwatch 310 to smartphone 330 may involve more than the transferral of health data from the smartwatch to the smartphone. For example, if the workout is being administered through an app that provides instructions to the user, the handoff action may also involve having the workout app launched on the smartphone. In this way, instead of instructions for the workout continuing on through the smartwatch, such instructions may continue through smartphone 330 via the workout app launched on the smartphone 330. As such, while the smartwatch may continue to collect data from the user or wearer during the workout, instructions may be received from the smartphone 330 and data collected while the workout continues may be displayed on the smartphone.

More generally, one device may be considered a primary device and another a secondary device. The primary device may be defined as the device on which the user's attention is initially focused and the secondary device the device to which content or data is handed off to. For instance, the primary device (e.g., the smartwatch) may contain the user interface (UI) and content of the ongoing activity. A "handoff" would then be to a phone, which becomes the primary device displaying the ongoing UI, however the smartwatch may still participate in the session in a more lightweight manner. The smartwatch may continue collecting user information and have a status indicator and a way to re-enable it as the primary device (to bring the session UI back to the smartwatch if desired). For instance, the smartwatch have an area on its display to select switching the session back to the UI.

The system 300 includes two devices, smartwatch 310 and smartphone 330. In accordance with an aspect of this technology, the devices communicate with each other securely without requiring pairing of the two devices. Secure communications are enabled for instance by having the devices share keys or other security codes through a common account. For example, each device may be registered with an online account. Each device may then generate a unique key or code that it can use to encrypt data that it will communicate to another device. A server or other computer on which the common account resides may then share the key with other devices that are registered with the account. As such, when a first device receives encrypted information from a second device, the first device may decrypt the information received from the second device as it would have (or provided it has) received from the server the key used by the second device to encrypt the data transmitted or, more generally, communications from the second device.

In the system 300, a smartwatch 310 and a smartphone 330 are used as example computing devices. In other examples, the computing devices of the system may include any of the computing devices discussed above in relation to FIG. 1. For instance, the handoff may occur between a smartphone and smart display/TV. The handoff may also comprise a handoff from the smart display/TV to the smartphone or the smartwatch. Similarly, a handoff may take place from the smartphone to the smartwatch. The devices involved in the handoff are determined based on the device the user first uses and other nearby devices the user may encounter as they change location. For instance, a user may be in the process of using a banking application on their smartphone and enter an area where their desktop computer is located and may initiate a handoff of the data and/or application associated running on the smartphone to the desktop computer, as long as the devices detect or sense each other and the desktop computer has the key or code that the smartphone will use in sending the data. As such, the disclosed technology may occur between any two devices. In addition, the technology may be configured such that handoffs of the same data or content may take place from one device to multiple other devices.

Example Processes and/or Methods

Figure 4A:
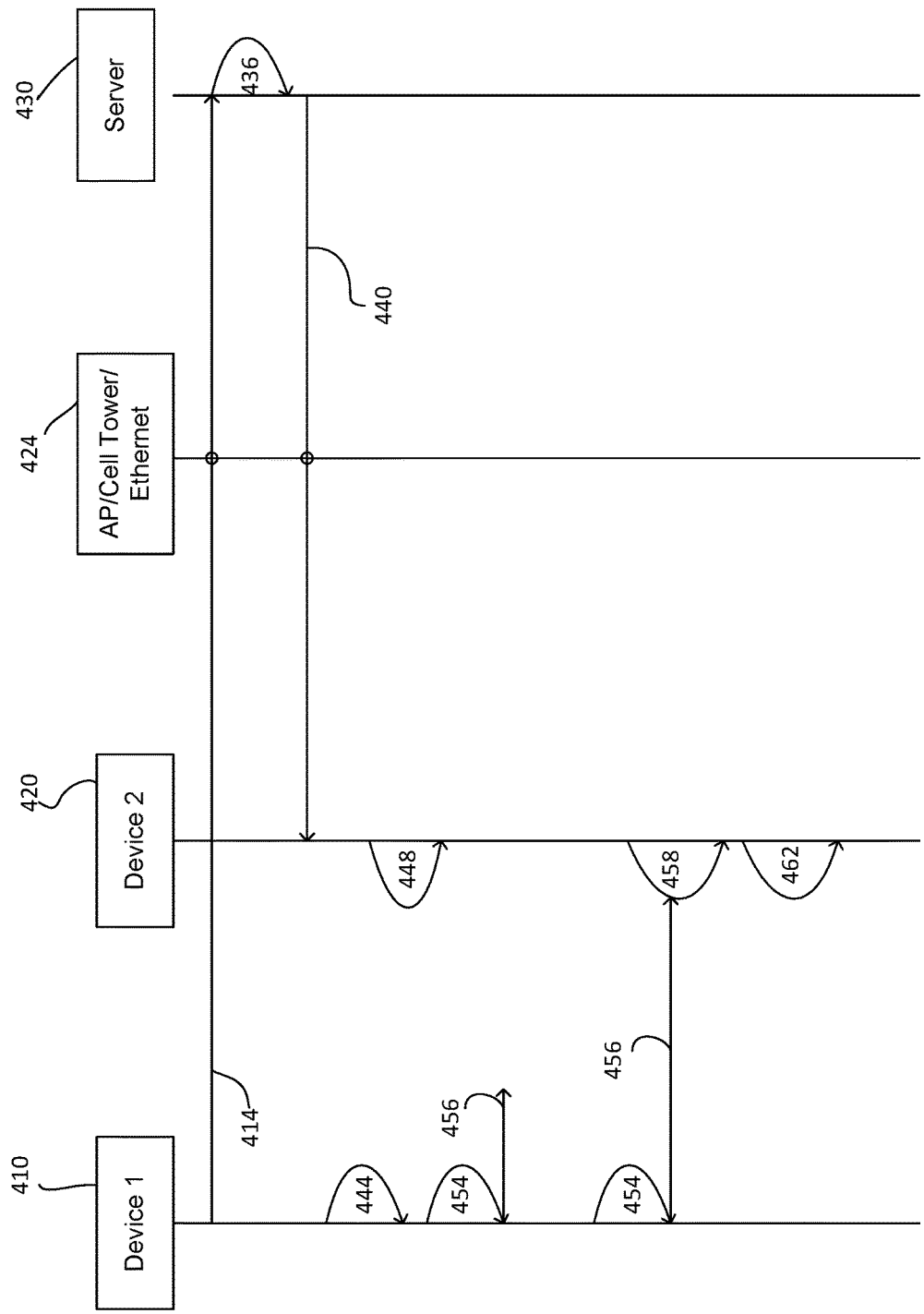
FIG. 4A illustrates an example of a process in accordance with an aspect of the disclosed technology.

In this regard, FIG. 4A illustrates an example of a process 400 in the form of a swim lane diagram in accordance with the disclosed technology. The process 400 illustrates data handoff between a first device 410 and a second device 420 in accordance with one or more aspects of the disclosed technology. As illustrated, the first device 410 sends a unique key 414, via block 424, to server 430. Block 424 may comprise AP 106, a cellular tower that's part of a cellular system, an Ethernet system inclusive of switches, routers, etc., or any other system that enables communication with server 430 by first device 410 and/or second device 420. Server 430 may comprise any one or more of computing devices 130, 132, 134. In addition, the functionality provided by server 430 may also be provided by a user device, such as for example laptop 112, desktop 114, or phone 108. Other devices in this regard may also comprise a home speaker. In these latter examples, a local device that is part of the on-premise or LAN in FIG. 1 may provide the key registration and sharing functionality described in relation to server 430.

The unique key is generated locally on or by first device 410. It may comprise either a randomly generated string or a string generated by a hash function. Once generated the key is sent to server 430 as illustrated at line 414. Server 430 may store the key in a tuple such that it is linked to a user account associated with the first device 410. The tuple may be, for example, of the form: (User_acct., device ID, new_encryption_key, old_encryption_key, new_TTL (time to live), old_TTL). "old_TTL" refers to the expiration date of the old key, at which point it becomes invalid and its associated field in the tuple zeros out or is set to zero. The new_encryption_key and old_encryption_key may be stored in case, for example, a WiFi or network connection fails and keys are not updated locally on other nearby devices. Server 430 may comprise a server that manages a user account, such as a Google account or any other account used for authentication that supports server-side storage and maintenance of keys. Devices used by the user may be registered with the account. In some instances, in addition to being registered, a device may be required to be signed in in order to receive unique keys generated by other devices associated with the account.

Server 430 stores the keys it receives for each registered device and other processes the key information it receives (e.g., manipulate it for storage and/or transmission), as indicated at loop 436. Server 430 also shares the keys for each device with other devices associated with the user account. As shown in FIG. 4A, server 430, for example, may share the unique key it received from first device 410 with second device 420, as indicated at 440. To the extent there are other devices registered and/or signed into the user account, server 430 may also share the unique key with those devices, as well as share keys generated by those devices among other registered devices. Nearby or candidate devices may then use either the old or new key in an attempt to decrypt received content or data. When a new key or hash is created, all devices associated with an account may update their local storage with the new key or hash information.

In accordance with an aspect of the disclosed technology, first device 410 and second device 420 implements proximity detection in order to detect nearby devices. Proximity detection is illustrated, for example, by loops 444 and 448 in FIG. 4A. Proximity detection may be implemented in multiple ways depending on the wireless technology deployed. Techniques that may be used include measuring round trip based on a transmitted or reflected signal. Ultrawideband (UWB) may also be used where two nearby devices employ UWB. Further, Bluetooth low energy (BLE) may also be used to estimate the distance between nearby devices. In addition, Bluetooth received signal strength indication (RSSI). RSSI provides an indication of the power level received by an antenna and may be used to sense or detect nearby devices with their Bluetooth radio on. As received signal strength varies based on antenna design, RSSI trend may be used to determine a changing distance between devices in place of using the absolute value of RSSI. Where three are more devices are nearby a given device, trilateration may be used to estimate the distance between the devices.

When first device 410 detects that second device 420 is within a predetermined distance, e.g., based on an RSSI value, it may initiate a handoff suggestion of data or content to a user via second device 420, as indicated at loop 450. If the user selects the suggestion so that handoff may take place, a scanning and advertisement scheme similar to that used in BLE may be used to have data or content transmitted by first device 410 to second device 420. In some examples, the user may need to accept the handoff suggestion on both the first and second devices 410, 420. In other examples, the system may be implemented such that the user need only accept the suggestion on the first device 410. In this latter example, the first device 410 may then broadcast a message that when received at second device 420 notifies the second device 420 that it will be the recipient of data or content from the first device. This may be implemented, for example, by including the device identifier of the second device in the message that is broadcasted. This aspect of the technology may be implemented using BLE scanning and advertisement between multiple devices. As such, the technology employs a connectionless scheme. Because advertising is a form of "broadcast" all the nearby devices can listen. In general, devices communicate with each other without having to connect as a result of advertisement and scanning. In an example, devices may therefore periodically scan for BLE packets.

In some instances, the second device involved in the handoff will be clear given proximity to the device. For example, the device that is the closest device may be ranked highest and automatically selected as the second device. More specifically, when a first device is advertising data to initiate a handoff, the handoff candidates (recipients or second devices) can also advertise with their device IDs. The first device (e.g., watch) can then use those IDs along with the proximity metric to sort a list of devices that the user can choose from on the first device or watch that is "initiating" the handoff. In the cases where disambiguation may be needed, devices may be ranked as handoff candidates based on proximity. In addition, a user may be prompted to provide user input to select which device (i.e., the second device) data or content should be handed off to. In some examples, the user selection may be ranked based on proximity. In other instances, the user input may allow the user to select a different handoff candidate if desired.

Specifically, once first device 410 determines that it is to initiate handoff, it periodically advertises data (e.g., distance, app information, content) using BLE packets, as indicated at loop 454 and transmission line 456. Advertising involves packaging the data into a payload field after encryption (loop 454) and then transmitting (456) the one or more packets into the local environment. The advertisement payload may vary between 6 and 37 bytes, which may provide sufficient space to communicate encrypted information between devices. In some examples, more bytes may be used, e.g., up to 255 bytes. The payload of the advertisement packet may contain a custom preamble (within the data portion of the payload of a PDU) that is unencrypted and corresponds to the transmitting device's unique ID. This ID would be the same one in the tuple discussed above. Second device 420 acting as listener periodically scans for broadcasted packets, as indicated at loop 458. Second device 420 upon receiving transmission 456 may unpack the payload, read the device ID, use the device payload as hash in order to do a hash look table lookup, thereby obtaining the tuple that corresponds to the device. Although tuples are stored locally on user devices linked to a user account, the second device 420 may need some way to transition from "hey, I just got a device ID" to "here's what the data is." The period in-between the transition may require using the device ID to look up the tuple (locally), and thereafter obtaining the key to decrypt other or the remaining data. These steps are illustrated at loop 458. Once the tuple is obtained, it may be used to decrypt the rest of the payload. Once the payload is decrypted, the underlying data (e.g., heart rate information) may be processed for presentation to the user. These steps are illustrated by loop 462.

As described in the above examples, the technology is connectionless and does not establish point-to-point connection(s). As such, advertisement and scanning may be considered essentially unidirectional. In some examples, it may be possible to modify the technology to be more bidirectional by emulating features of point-to-point connections by using sequence numbers in the advertisement field's payload. As indicated above, advertisement packets may be transmitted or broadcasted periodically, e.g., retransmitted a certain number of times. This mitigates against listeners not picking up on packets being advertised. A sequence number or identifier may be included withing or attached to the advertisement packet if the data being transported is related to a time series (e.g., real-time heart rate).

FIG. 4B illustrates an example system 480 in accordance with an aspect of the disclosed technology. FIG. 4B illustratively depicts a broadcaster 484 and a listener or observer 486 using advertisements and scans to effect handoff of data from the broadcaster to the listener. Broadcaster 486 periodically transmits advertisements 490 into its surrounding environment. The periodicity of the transmissions (e.g., every 2 seconds) may depend, for example, on the type of data being collected by the broadcaster 486, which in this example may be a smartwatch as discussed above. If the data is heart rate data for example, it may need to be transmitted frequently enough so that the observer may display the data in a timely manner such that the user timely receives updated information. Data is exchanged and sent by concatenating strings into the advertisement packet payload field. Observer 486 may periodically scan 492 for advertisements and upon detecting an advertisement intended for it, further process the advertisement as previously described.

Broadcaster 484 may append an identifier to the header that indicates the type of data being sent to enable having real-time health stats on the observer 486. Observer 486 may then use the identifier to determine, for example, offsets between values in the payload field. The type of data may include, for example, heart rate, calories, steps, movement data, etc. in the case of a workout application.

Figure 5:
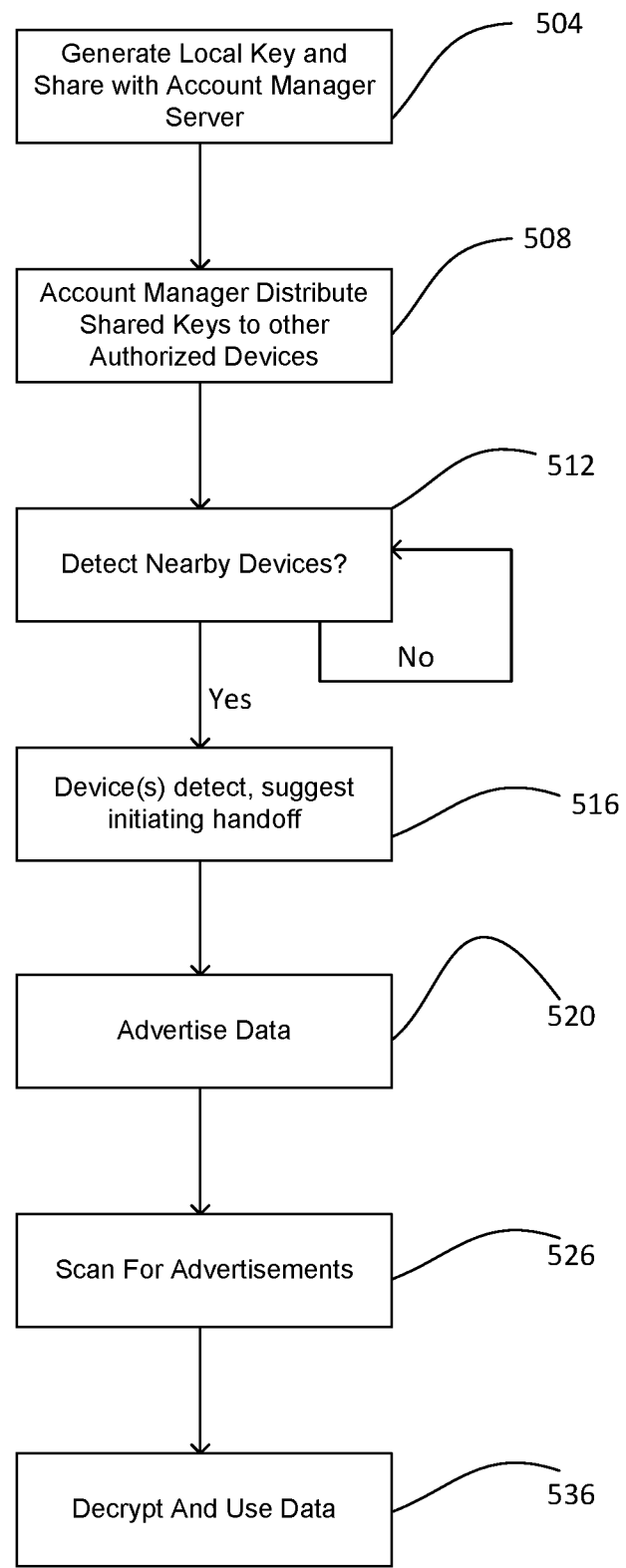
FIG. 5 illustrates an example of a process in accordance with an aspect of the disclosed technology.

FIG. 5 illustrates an example of a process or method 500 in accordance with an aspect of the disclosed technology. The method comprises a computing device generating a unique local key and sharing the local key with an account manager server, block 504. While the steps of generating and sharing are shown in block 504, they may be implemented as separate steps within the computing device. Account manager server associates the keys it receives from different devices with a user account. The user account may comprise a Google account or other account type of account.

At block 508, the account manager server shares keys it receives among computing devices associated with the user account. In order for a device to be authorized to receive keys of other devices associated with the account, the device should be registered with the account and/or signed into the account. When the device detects a nearby device, processing proceeds to block 516, where the device suggests to a user initiating data or application handoff to another nearby device it detected. The user may decline a handoff suggestion, for example, by selecting an option to decline or if the user does not affirmatively select handoff within a given time window.

At block 512, a device, for example, performs proximity detection to detect nearby devices. If no nearby devices are detected, the device continues by periodically performing proximity detection at block 512. When one or more nearby devices are detected, processing proceeds to block 516. At block 516, the device that detects nearby devices provides a user with the option to have an application running on the device or data on the device handed off to one of the nearby devices. If the user selects having the handoff occur, the devices that detected the nearby devices advertises data to be handed off to the nearby device at block 520. At block 526, the nearby device to whom the advertisements are intended for, detects the advertisement as part of a scan. At block 530, the scanning device, upon receiving the advertisement decrypts and make user of the data.

As discussed above, the technology may be used with applications such as a workout application or a banking application. The technology may also be used in other applications. For example, the application may be used where content is being streamed over the internet to a smartphone via YOUTUBE or content application. For example, a user may begin watching content streaming via YOUTUBE on a smartphone while on the bus on the way home from. As the user enters her home, she may turn on her smart display/TV. Once her smartphone detects that the smart display/TV is nearby, it may prompt the user to initiate handoff of the content streaming on the phone to the smart display/TV. If a user selects initiating handoff, the content may be switched without any further intervention from the user, such as would be required to establish a connection between the smart display/TV and the smartphone, e.g., inputting codes required for pairing.

In some examples, the technology may be implemented such that a user has control over which applications may make use of the handoff technology. This may be implemented by providing the user with the option of whitelisting certain applications running on the user devices. For example, a user may whitelist an exercise application but not a banking application. For applications not approved for being handed off between devices, the technology may be implemented to not provide a suggestion for handoff initiation even when nearby devices are detected. In addition, in some examples, handoff may occur without providing a suggestion to a user for initiating handoff. For example, as part of whitelisting an application, features may be provided that allow the user to select automatic handoff between specified devices. For example, for a workout application, the technology may be implemented such that handoff from a smartwatch or smartphone to a smart display/TV occurs automatically.

Aspects of the disclosed technology can include any combination of the following features and sub-features:

F1. A method for connectionless data handoff, comprising:
sending, by a first device, a locally generated first key to a computing device;
receiving, by the first device, from the computing device a locally generated second key of a second device;
scanning, by the first device, for encrypted data transmitted by the second device;
decoding, by the first device, using the second key encrypted data transmitted by the second device to produce decrypted data; and
processing, by the first device, the decrypted data for display on the first device.

F2. The method of F1, wherein the first device comprises a device with a larger screen than the second device.

F3. The method of any one of F1 through F2, wherein the first device stores the second key as part of a tuple that further comprises user account information, a device ID associated with the second device, an old encryption key associated with the second device, a TTL (time to live) of the old encryption key.

F4. The method of any one of F1 through F3, comprising associating, by the computing device, the first key and second key with a user account.

F5. The method of any one of F1 through F4, comprising generating, by the first device, the first key using a hash function or randomly generated string generated by the first device.

F6. The method of any one of F1 through F5, comprising sensing, by the first device, the presence of the second device.

F7. The method of any one of F1 through F6, wherein sensing comprises determining a distance between the first device and the second device using round trip delay.

F8. The method of any one of F1 through F7, wherein determining comprises using wireless technology to detect the distance.

F9. The method of any one of F1 through F8, wherein the decrypted data comprises one or more of video content or health statistics.

F10. The method of any one of F1 through F9, wherein the computing device comprises a server coupled to the first device and second device over a first network.

F11. The method of any one of F1 through F10, wherein scanning is performed by the first device over a second network different than the first network.

F12. A method for connectionless handoff of data, comprising:
sending, by a first device, a locally generated first key to a computing device;
receiving, by the first device, a second key generated by a second device;
sensing, by the first device, a location of a second device within a predetermined distance of the first device; and
periodically broadcasting, by the first device, content encrypted using the first key to the second device.

F13. The method of F12, wherein the first device comprises a device with a smaller screen than the second device.

F14. The method of any one of F11 through F13, wherein the first device stores the second key as part of a tuple that further comprises user account information, a device ID associated with the second device, an old encryption key associated with the second device, a TTL (time to live) of the old encryption key.

F15. The method of any one of F11 through F14, comprising associating, by the computing device, the first key and second key with a user account.

F16. The method of any one of F11 through F15, comprising generating, by the first device, the first key using a hash function or randomly generated string generated by the first device.

F17. The method of any one of F11 through F16, wherein sensing comprises determining a distance between the first device and the second device using round trip delay.

F18. The method of any one of F11 through F17, wherein determining comprises using one of ultrawideband signals, Bluetooth low energy signals, or Bluetooth RSSI signals to detect the distance.

F19. The method of any one of F11 through F18, wherein the encrypted content comprises one or more of video content or health statistics.

F20. The method of any one of F11 through F19, wherein the computing device comprises a server coupled to the first device and second device over a first network.

F21. The method of any one of F11 through F20, wherein scanning is performed by the first device over a second network different than the first network.

F22. The method of any one of F11 through F21, comprising periodically broadcasting the content encrypted using the first key over the second network.

Although different aspects of the invention herein have been described with reference to particular embodiments, it is to be understood that these embodiments are merely illustrative of the aspects, principles, and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for secure connectionless data communications, comprising:
   receiving, by a first device, from a computing device a locally generated second key of a second device, the second key associated with a user account with which the first device and the second device are registered;
   scanning, by the first device, for encrypted data broadcasted by the second device;
   decoding, by the first device, using the second key, the encrypted data broadcasted by the second device to produce decrypted data; and
   processing, by the first device, the decrypted data for display on the first device.

2. The method of claim 1, wherein the first device comprises a device with a larger screen than the second device.

3. The method of claim 1, wherein the first device stores the second key as part of a tuple that further comprises user account information, a device ID associated with the second device, an old encryption key associated with the second device, a TTL (time to live) of the old encryption key.

4. The method of claim 1, comprising registering, by the computing device, the first device and second device with the user account.

5. The method of claim 1, comprising generating, by the second device, the second key using a hash function or randomly generated string generated by the second device.

6. The method of claim 1, comprising sensing, by the first device, the presence of the second device.

7. The method of claim 6, wherein sensing comprises determining a distance between the first device and the second device using round trip delay.

8. The method of claim 7, wherein determining comprises using wireless technology to detect the distance.

9. The method of claim 1, wherein the decrypted data comprises one or more of video content or health statistics.

10. The method of claim 1, wherein the computing device comprises a server coupled to the first device and second device over a first network.

11. The method of claim 10, wherein scanning is performed by the first device over a second network different than the first network.

12. A method for secure connectionless data communications, comprising:
    sending, by a first device, a locally generated first key to a computing device, the first device registered with a user account;
    sharing, by the computer device, the first key with a second device registered with the user account;
    sensing, by the first device, a location of the second device within a predetermined distance of the first device;
    periodically broadcasting, by the first device, content encrypted using the first key; and
    decoding, by the second device, the content using the first key.

13. The method of claim 12, wherein the first device comprises a device with a smaller screen than the second device.

14. The method of claim 12, wherein the second device stores the first key as part of a tuple that further comprises user account information, a device ID associated with the first device, an old encryption key associated with the first device, a TTL (time to live) of the old encryption key.

15. The method of claim 12, comprising associating, by the computing device, the first key and second key with the user account.

16. The method of claim 12, comprising generating, by the first device, the first key using a hash function or randomly generated string generated by the first device.

17. The method of claim 12, wherein sensing comprises determining a distance between the first device and the second device using round trip delay.

18. The method of claim 17, wherein determining comprises using one or more wireless signals to detect the distance.

19. The method of claim 12, wherein the encrypted content comprises one or more of video content or health statistics.

20. The method of claim 12, wherein the computing device comprises a server coupled to the first device and second device over a first network.

21. The method of claim 20, wherein scanning is performed by the first device over a second network different than the first network.

22. The method of claim 21, comprising periodically broadcasting the content encrypted using the first key over the second network.

\* \* \* \* \*